(Model.)

S. NEEDLES.
LOCK HINGE.

No. 256,361. Patented Apr. 11, 1882.

Witnesses:
W. H. Mortimer
L. M. Babcock

Inventor:
S. Needles,
per
F. A. Lehmann,
Atty

UNITED STATES PATENT OFFICE.

SIMGESMER NEEDLES, OF SEDALIA, MISSOURI, ASSIGNOR OF ONE-HALF TO DAVID H. SMITH, OF SAME PLACE.

LOCK-HINGE.

SPECIFICATION forming part of Letters Patent No. 256,361, dated April 11, 1882.

Application filed February 16, 1882. (Model.)

*To all whom it may concern:*

Be it known that I, SIMGESMER NEEDLES, of Sedalia, in the county of Pettis and State of Missouri, have invented certain new and useful Improvements in Hinges; and I do hereby declare the following to be a full, clear, and exact description of the invention, such as will enable others skilled in the art to which it pertains to make and use it, reference being had to the accompanying drawings, which form part of this specification.

My invention relates to an improvement in reversible shutter-hinges; and it consists in making the hinge in two parts, one of which is provided with two studs or projections, which extend toward each other, and which have their inner ends separated but a very slight distance, while the other part has a pintle-eye which extends out from one side, and which is made to pass in between the ends of the two studs or projections, as will be more fully described hereinafter.

The object of my invention is to construct a hinge which is not only reversible, but much stronger for the same weight of metal, and which will prevent the shutter from being thrown off by accident.

Figure 1:
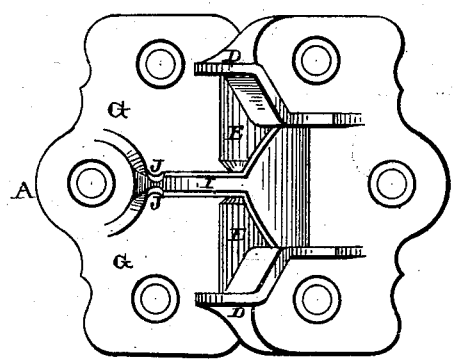
Figure 2:
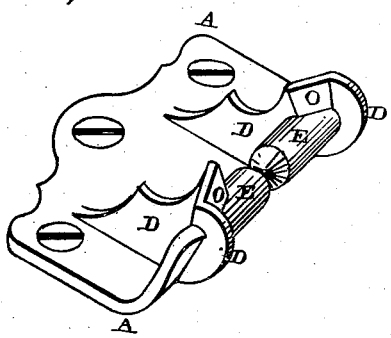
Figure 3:
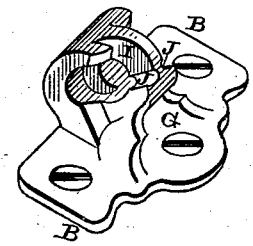
Figure 4:
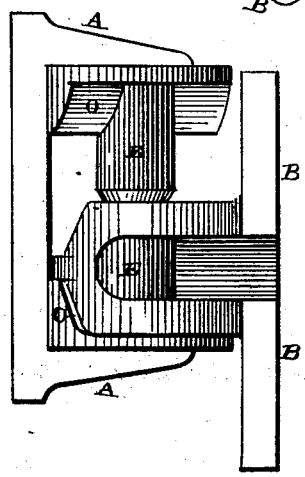

Figure 1 is a side elevation of my invention complete. Figs. 2 and 3 represent the two parts in perspective. Fig. 4 shows a rear edge view of the two parts of the hinge locked together.

The hinge is composed of the two parts A B. The part A is composed of the flat plate which bears against the side of the frame, and through which the screw-holes are made in the usual manner. Extending horizontally outward from this flat portion C are the two extensions D, from each one of which extends vertically the stud or projection E. These two studs or projections are in a direct line with each other, and have their ends separated but a very slight distance. The part B also consists of a flat plate, G, through which the screw-holes are made, and from the center of which extends outward the flat pintle-eye I, down through the center of which is made the opening through which the studs or projections pass. This pintle-eye has a groove, J, made in both its upper and lower portions, at one side, so as to make the web at this point just thin enough to pass between the inner ends of the studs or projections. For one-half of the distance around, upon both top and bottom of the pintle-eye, the thickness is just sufficient to prevent that part from passing through between the two projections; but the other half of the pintle-eye is widened out, as shown, so that as the other part, A, is turned by the movement of the shutter it will rise upward upon this thickened portion of the pintle-eye when the shutter is closed, and when the shutter is opened it drops downward off of the thickened portion, so that the wind cannot cause the shutter to close without first rising upon the wider part of the pintle-eye. In order that the other part of the hinge may rise readily upon this thickened part of the pintle-eye the ends are inclined, as shown, so that the act of closing the shutter will cause it to rise upward, as shown in Fig. 1. After the part A of the hinge is dropped downward off of the thickened part of the pintle-eye the end of the pintle-eye catches against the shoulder O, which is made upon the extension at the base of one of the projections, and the two parts fitting together causes them to lock in such a manner that it will require a considerable wind or force to cause the shutter to swing shut.

This hinge is made reversible, and so can be applied to either side with equal facility. In order to separate the two parts it is necessary to open them and then raise the part A until the two ends of the projections come just opposite the grooves made in the thin part of the pintle-eye and then draw that part outward, thus requiring three movements to separate the two parts.

By means of this construction a stronger hinge can be made for the same weight of metal than has heretofore been produced.

Having thus described my invention, I claim—

1. A hinge composed of the two parts A B, the part A being provided with the two projections E and the part B with the flat pintle-eye, which passes in between the inner ends of the projections, substantially as shown.

2. A hinge composed of the two parts A B, the part A being provided with the two projections, which are placed in line with each other and have their ends separated but a slight distance, the part B being provided with the flat central pintle-eye, I, which has suitable inclines formed upon it, substantially as described.

3. A hinge composed of the two parts A B, the part A being provided with the two projections placed in line with each other, and the part B having a pintle-eye projecting outward from its center, which is grooved upon opposite sides, substantially as specified.

In testimony whereof I affix my signature in presence of two witnesses.

SIMGESMER NEEDLES.

Witnesses:
BURWELL G. WILKERSON,
JOHN MONTGOMERY, Jr.